US011393277B2

(12) United States Patent
Perrow et al.

(10) Patent No.: US 11,393,277 B2
(45) Date of Patent: Jul. 19, 2022

(54) GAMING MACHINE DISPLAY, SYSTEMS AND METHODS

(71) Applicant: ARISTOCRAT TECHNOLOGIES AUSTRALIA PTY LIMITED, North Ryde (AU)

(72) Inventors: Shane Perrow, Kembla Heights (AU); Martin Holland, Warriewood (AU); Harsh Kaira, North Ryde (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 77 days.

(21) Appl. No.: 16/832,659

(22) Filed: Mar. 27, 2020

(65) Prior Publication Data

US 2020/0312081 A1 Oct. 1, 2020

Related U.S. Application Data

(60) Provisional application No. 62/826,482, filed on Mar. 29, 2019.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3211* (2013.01); *G07F 17/3209* (2013.01); *G07F 17/3216* (2013.01)

(58) Field of Classification Search
USPC ........................ 463/1, 20, 22, 25, 29, 30, 31
See application file for complete search history.

(56) References Cited

U.S. PATENT DOCUMENTS

| | | | | |
|---|---|---|---|---|
| 6,690,337 | B1 * | 2/2004 | Mayer, III | H04N 9/12 345/1.1 |
| 8,031,200 | B2 | 10/2011 | Goodart et al. | |
| 8,591,330 | B2 | 11/2013 | Kelly et al. | |
| 9,400,576 | B2 | 7/2016 | Chen et al. | |
| 9,672,691 | B2 | 6/2017 | Antkowiak et al. | |
| 10,482,706 | B2 | 11/2019 | Nicely et al. | |
| 2004/0038721 | A1 * | 2/2004 | Wells | G07F 17/3262 463/16 |
| 2004/0229693 | A1 | 11/2004 | Lind et al. | |
| 2016/0162245 | A1 | 6/2016 | Choi | |
| 2016/0364946 | A1 | 12/2016 | Castro et al. | |
| 2017/0004673 | A1 * | 1/2017 | Loose | G07F 17/3209 |
| 2018/0276942 | A1 * | 9/2018 | Whelan | G07F 17/3216 |

* cited by examiner

*Primary Examiner* — Adetokunbo O Torimiro
(74) *Attorney, Agent, or Firm* — Armstrong Teasdale LLP

(57) ABSTRACT

A composite display device for an electronic gaming device includes a primary display device includes a first borderless edge and a secondary display device includes a second borderless edge. The composite display device also includes a housing for mounting the primary display device and the secondary display device, the primary display device being mounted with the first borderless edge adjacent to the second borderless edge of the secondary display device, thereby forming a display junction between the primary display device and the secondary display device. The composite display device further includes a touchscreen device for receiving touch input from a player of the electronic gaming device, the touchscreen device covering at least a portion of the primary display device and a portion of the secondary display device.

20 Claims, 9 Drawing Sheets

GAMING MACHINE DISPLAY, SYSTEMS AND METHODS

CROSS-REFERENCE TO RELATED APPLICATIONS

This application claims the benefit of priority to U.S. Provisional Patent Application No. 62/826,482, filed 29 Mar. 2019, entitled "GAMING MACHINE DISPLAY, SYSTEMS AND METHODS," the entire contents and disclosure of which are hereby incorporated herein by reference in their entirety.

TECHNICAL FIELD

The field of disclosure relates generally to casino gaming, and more particularly to systems and methods for providing a gaming machine display.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player via a printed "ticket" upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a composite display device for an electronic gaming device is provided. The composite display device includes a primary display device that includes a first borderless edge. The composite display also includes a secondary display device that includes a second borderless edge. The composite display further includes a housing for mounting the primary display device and the secondary display device. The primary display device is mounted with the first borderless edge adjacent to the second borderless edge of the secondary display device, thereby forming a display junction between the primary display device and the secondary display device. The composite display device also includes a touchscreen device for receiving touch input from a player of the electronic gaming device. The touchscreen device covers at least a portion of the primary display device and a portion of the secondary display device.

In another aspect, an electronic gaming machine is provided. The electronic gaming machine includes a credit input device including at least one of a card reader, a ticket reader, a bill acceptor, a coin input device, and digital wallet interface. The credit input device is configured to receive a credit wager. The electronic gaming machine also includes a storage medium having instructions stored thereon. The electronic gaming machine further includes a game controller configured to execute instructions stored in a tangible, non-transitory, computer-readable storage medium. When executed by the game controller, the instructions cause the game controller to provide a wagering game. The electronic gaming machine also includes a primary display device that includes a first borderless edge. The electronic gaming machine further includes a secondary display device that includes a second borderless edge. The electronic gaming machine also includes a housing for mounting the primary display device and the secondary display device. The primary display device is mounted with the first borderless edge adjacent to the second borderless edge of the secondary display device. The electronic gaming machine further includes a touchscreen device for receiving touch input from a player of the electronic gaming device. The touchscreen device covers at least a portion of the primary display device and a portion of the secondary display device.

BRIEF DESCRIPTION OF THE DRAWINGS

An example embodiment of the subject matter disclosed will now be described with reference to the accompanying drawings.

DETAILED DESCRIPTION

Figure 1:
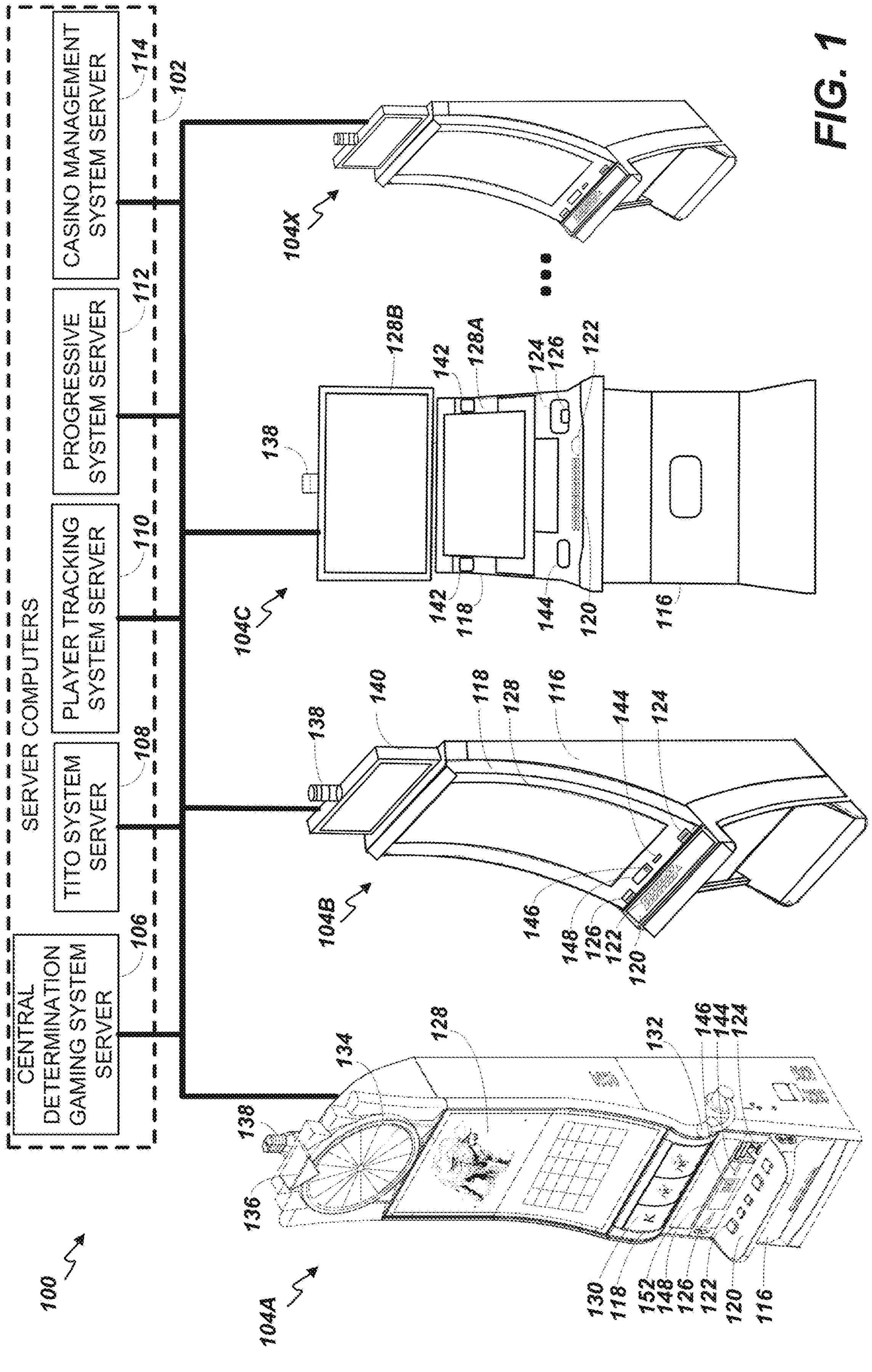
FIG. 1 is a diagram of exemplary EGMs networked with various gaming-related servers.

Electronic gaming machines ("EGMs") typically include displays for displaying information (e.g., wagering games) to users. One recent trend in EGMs is the use of large curved displays. Larger displays allow for an expanded primary game playing area, more and larger graphics outside of the primary game playing area, and attractive graphics directed at spectators rather than the primary player (e.g., as a tool of marketing for the game to nearby patrons). However, these curved displays tend to require custom design and manufacturing, which can be both expensive and difficult to keep commercially available. Another recent trend is toward touchscreen (or "touch screen") displays. Touchscreens are typically provided over a primary display and allow the player to interact with the EGM on the primary display. Using such touchscreens allow game designers to design games through which the player may provide touch inputs during game play (e.g., video poker, some types of slot games, and the like). As used herein, a "display" refers to a display unit used for displaying electronic information (e.g., digital symbols, graphics, and the like) to players and spectators.

In one example embodiment, a composite display assembly for an EGM is described herein, as well as associated systems and methods. The composite display integrates multiple flat-surface display units together with a single touchscreen surface. In an example embodiment, two flat-surface displays are mounted together, namely a secondary display is mounted above a primary display. Further, the secondary display is angled at a "display inclination" relative to the primary display such that the composite display, when viewed as a whole, provides certain aesthetics and practical benefits of both a large screen (e.g., additional display surface) and a curved screen (e.g., appeal to players, improved viewing angle).

In the example embodiment, the composite display assembly also includes a single touchscreen surface that extends over (e.g., overlays) the front surfaces of both the primary and secondary displays, forming a slight curve at a "display junction" where the two displays meet. During operation, a composite graphic may be generated by an underlying wagering game of the EGM and split into synchronized primary display graphics and secondary display graphics such that the composite display appears to be one integrated display. Providing a single touchscreen surface across both displays allows touch actions to occur on either or both displays and, in some use cases, across both displays (e.g., allowing the player to drag a movable virtual game element from the primary display to the secondary display by dragging pressing and dragging their finger from a primary surface of the touchscreen to a secondary surface of the touch screen, across the display junction).

In some embodiments, the composite display may include integration of the primary display (and possibly the secondary display) with a button deck and a button deck display. The button deck display allows graphics to be presented on the button deck and may be similarly angled relative to the primary display to provide an integrated graphics environment. Further, the single touchscreen surface may be extended to cover the button deck display, thereby similarly allowing an integrated touch environment that includes both the button deck, the primary display, and perhaps the secondary display. This button deck of the EGM may be configured to display aspects of the wagering game (e.g., provide a graphic of a coin purse into which virtual coin winnings cascade on a winning outcome), provide control inputs for the player (e.g., virtual buttons to initiate a play of the wagering game, cash out, or other conventional button features), or hybrid uses (e.g., allowing a player to pick cards on the button deck, display their hand of cards on the button deck, move virtual game elements from button deck to display or vice versa, and so forth).

The composite display assembly is integrated into an EGM, such as a slot machine or a virtual poker machine, which provides an underlying wagering game such as a slot game, a card game, or other virtual wagering game. The use of multiple flat-surface displays with a single touchscreen allows for a larger, integrated touchscreen display area at a cheaper cost than conventional custom-manufactured curved displays while still providing some of the aesthetics and function of a single curved display unit. Extending the display integration into a button deck display provides integration into the primary input surface of an EGM, the button deck. The composite display assembly also provides a hardware environment in which developers can more seamlessly create game content, as the integration of touchscreen controller with multiple displays alleviates the necessity of managing multiple touchscreen devices. Further, reducing the number of touchscreen devices also reduces the overall cost of the EGM by reducing the number of touchscreen controllers, which can be expensive.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server (not separately shown), a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket (e.g., a voucher) to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
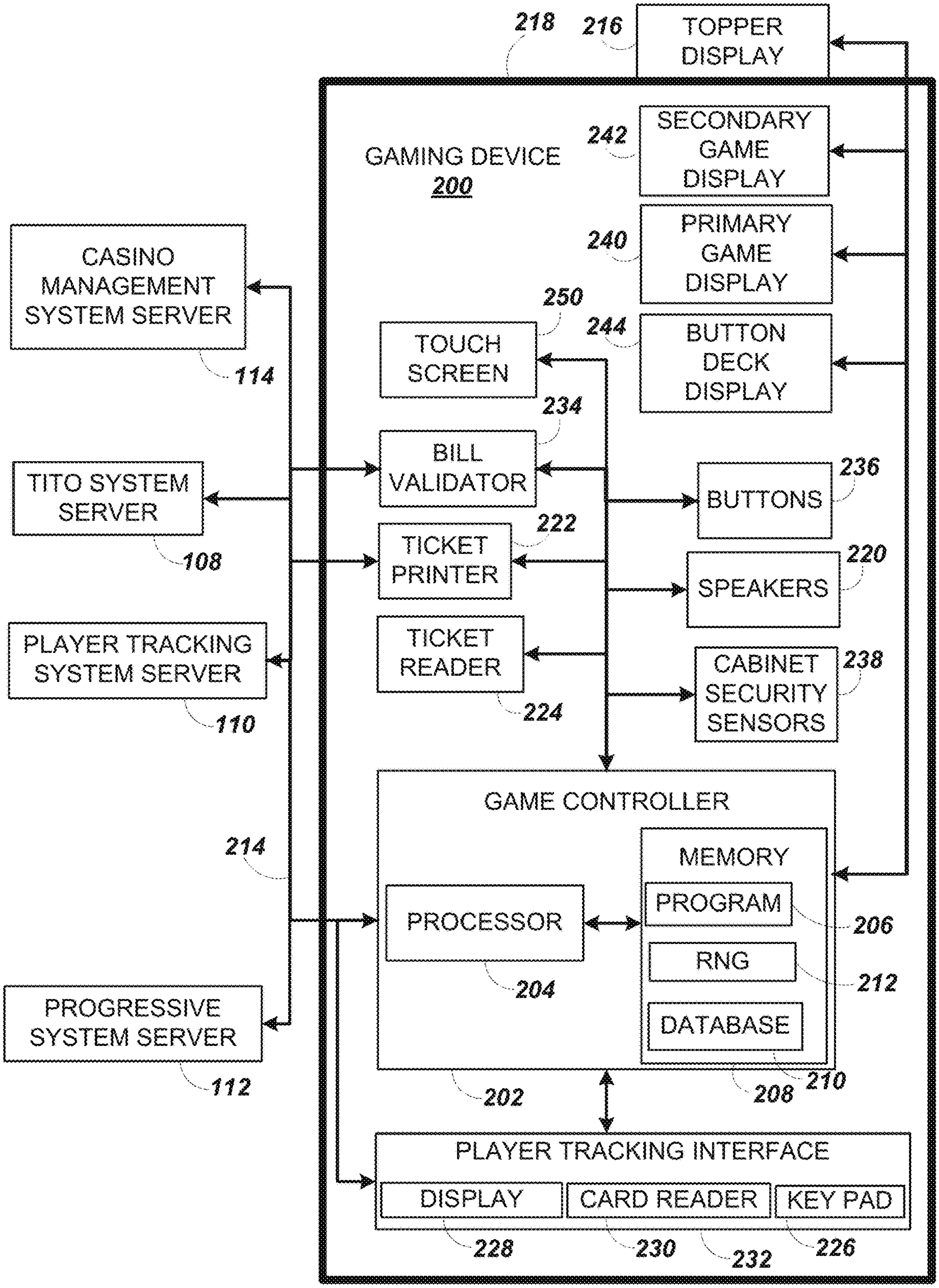
FIG. 2 is a block diagram of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

The present disclosure describes a composite display for gaming devices 104 that integrates multiple individual displays together to simulate, or otherwise give the impression to players and spectators, a larger curved screen. While curved screens provide an aesthetic appeal to many players, the increased display area provides various technical advantages to game developers and players alike. Increased display area allows electronic games to include larger graphics, additional graphics, and in some cases additional display area for spectators and passers-by (e.g., for attracting attention). Cost can be reduced by using In some embodiments, integration with a button deck allows for digital display output to be presented on a button deck display. Further, inclusion of a touchscreen device that spans multiple display devices enables touchscreen functionality that can span those multiple displays, allowing gestures to be performed across display regions. Such integration eases developer burden in what may otherwise require advanced coordination between multiple touchscreen controllers, as well as additional costs associated with multiple touchscreen controllers.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. In some embodiments, the one or more processors 204 may include a general-purpose processor, such as a central processing unit (CPU), or a specialized processor, such as a graphics processing unit (GPU), a digital signal processor (DSP), a hardware accelerator, or such. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as the central determination gaming system server. The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202. In some embodiments, the gaming device 200 may include a credit input device in the form of a digital wallet interface (not shown). The digital wallet interface may be configured to wirelessly connect to a mobile computing device of a player (e.g., via Bluetooth or other NFC technology), allowing the player to transfer credit between a digital wallet of the player and the gaming device 200. In some embodiments, the gaming device 200 may include other processors (e.g., display controllers, LCD controllers, and so forth, not separately shown in FIG. 2) that are configured to receive video input signals or instructions (e.g., from the game controller 202) that cause the game displays 240, 242 to display images during operation. In some embodiments, such display controllers may be integrated into the game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 (which may include a touch screen), or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Described in further detail below is a composite display for the gaming device 200 that, for example, may combine primary game display 240 and secondary game display 242, along with a single touchscreen input surface, into a larger unit that can provide the appearance of a single, larger touchscreen device. In the example embodiment, the gaming device 200 includes a touchscreen device (or just "touchscreen") 250 that acts as an input surface for receiving touch gestures performed by the player during game play. The touchscreen 250 may cover portions of game displays 240, 242. In some embodiments, a button deck display 244 is provided. The button deck display 244 may provide display output (e.g., graphics) on a button deck (not separately shown in FIG. 2) of the gaming device 200. Further, in some embodiments, the touchscreen 250 may extend to cover portions of button deck display 244, thereby allowing the gaming device 200 to provide virtual button functionality to the player. It should be understood that, while not separately depicted, touchscreen 250 may include one or more sensors configured to detect touch gestures made by a player, as well as a touchscreen controller configured to, for example, manage outputs from the sensors and transmit outputs to the game controller 202. Touchscreen 250 can implement various touchscreen technologies known in the industry, such as, for example, resistive touchscreens, capacitive touchscreens (e.g., projective, surface), infrared touchscreens, acoustic wave touch screens, near field imaging touchscreens, or the like.

Figure 3:
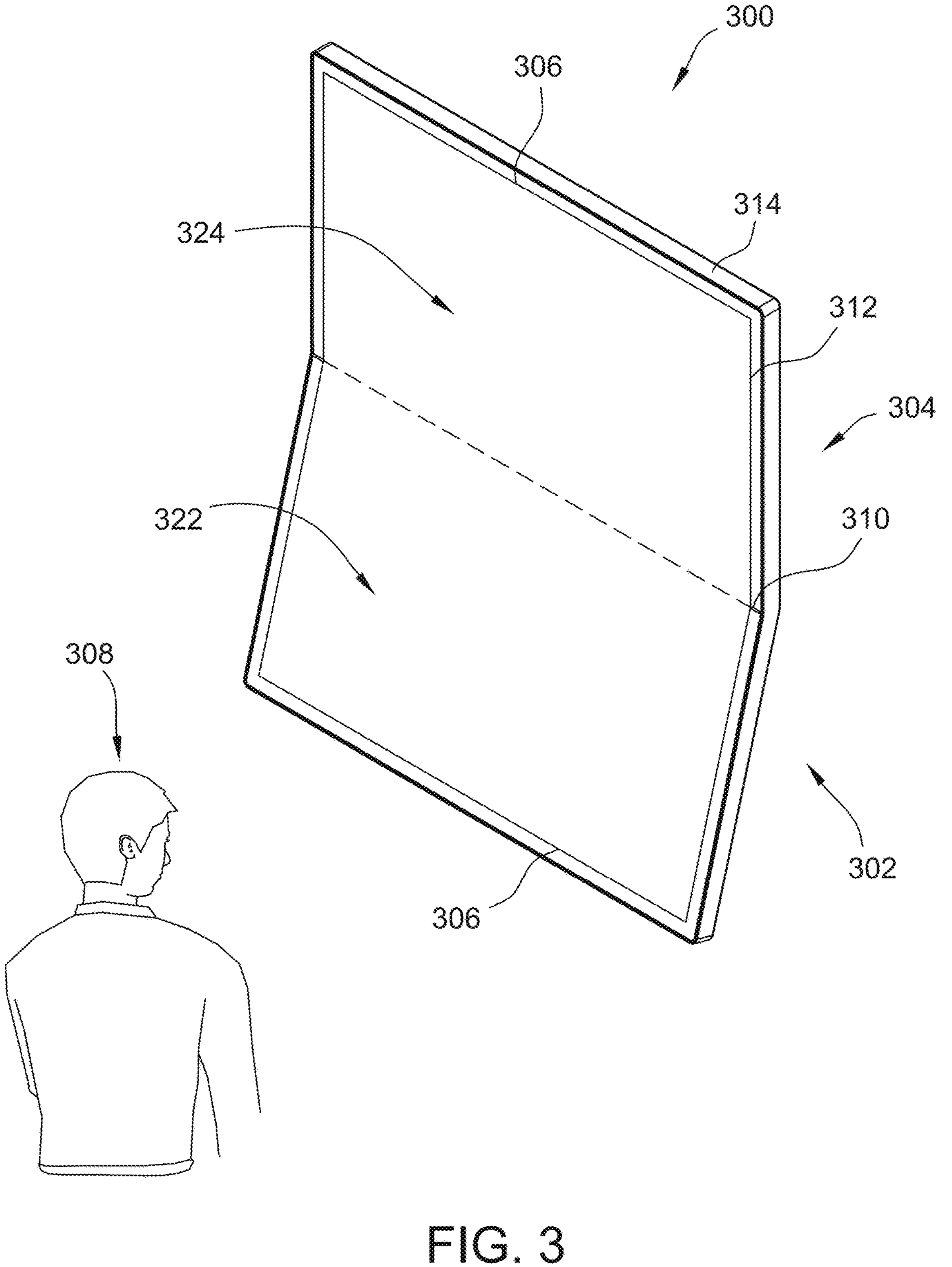
FIG. 3 is a perspective view of a composite display for an EGM such as the gaming device shown in FIG. 2.

FIG. 3 is a perspective view of a composite display 300 for an EGM such as the gaming device 200. In FIG. 3, the composite display 300 is depicted without various other components of the gaming device 200 for ease of explanation. In the example embodiment, the composite display 300 includes a primary display 302 and a secondary display 304 aligned together at a display junction 310, with the primary display 302 being angled at a display inclination relative to the secondary display 304. The term "display inclination," as used herein, refers to a relative angle between two displays (e.g., displays 302, 304). Each of primary display 302 and secondary display 304 are flat panel displays configured to output digital video for consumption by a player 308 during operation (e.g., during play of a wagering game). For example, the displays 302, 304 may be liquid-crystal display ("LCD") screens displaying a video slot game, video poker, or the like. In some embodiments, displays 302, 304 may be light-emitting diode ("LED") or microLED displays. Displays 302, 304 may be similar to primary game display 240 and secondary game display 242 shown in FIG. 2.

Each of the displays 302, 304, in the example embodiment, are individual 27" flat panel LCD displays bordered on three sides by a bezel 312. In some embodiments, the displays 302, 304 may be three-side or four-side borderless displays and the bezel 312 may be added as an after-market addition. The displays 302, 304 are contained within a housing 314 that protects a rear of the displays 302, 304 and associated electronics. The displays 302, 304 are borderless at an adjoining edge represented by display junction 310. While 27" flat panel LCD displays are shown here, it should be understood that any size flat panel displays may be used. The displays 302, 304 may be displays such as those commercially available from LG Display (South Korea), Samsung Electronics (South Korea), AU Optronics Corporation (Hsinchu, Taiwan), Hitachi (Japan Display, Japan), Kyocera Corporation (Japan), Truly Semiconductor (China), and BOE Technology (China).

The composite display 300, in the example embodiment, also includes a touchscreen 306 mounted over the two displays 302, 304 at least partially covering display surfaces of displays 302, 304. The touchscreen 306 is a single sheet of a touch sensitive input sensor device configured to act as a player input device, detecting touch gestures performed by the player 308 during game play. The touchscreen 306 covers at least a portion of both the display surfaces of primary display 302 and the secondary display 304. In the example embodiment, the touchscreen 306 covers substantially all of the active surface of the displays 302, 304 (e.g., all of the pixels of the displays 302, 304, all of the pixels within an active display area provided by on the displays 302, 304).

In the example embodiment, the touchscreen 306 is a resistive touchscreen panel such as those made commercially available from, for example, Tovis Co., Ltd (Incheon Songdo, South Korea) or Zytronic Plc. (Blaydon on Tyne, United Kingdom). In some embodiments, the touchscreen 306 is based on projected capacitive (PCAP) sensing using indium tin oxide (ITO) electrodes connected to a sensing circuit (not separately shown). The ITO electrodes may be etched onto glass to form the touchscreen 306. In some embodiments, the touchscreen 306 is a surface capacitive touchscreen panel that determines the location of touch interactions based on the change in capacitance (e.g., as measured from the four corners of the panel). The touchscreen 306 bends at display junction 310 to conform to the surfaces of the displays 302, 304. In some embodiments, touchscreen 306 may be excluded and may be replaced with a protective coating that does not function as a player input device.

During configuration of the composite display 300, calibration of the touchscreen 306 may be performed. Calibration allows video output locations on displays 302, 304 to be synchronized with physical locations on the touchscreen 306. Calibration may include, for example, displaying multiple points on primary display 302 (e.g., within primary surface 322) or secondary display 304 (e.g., within secondary surface 324) and receiving inputs from the touchscreen 306 as a user touches the points displayed. These input locations from the touchscreen 306 for the known points within the displays 302, 304 may then be used as calibration references to adjust future inputs and associated display positions. The touchscreen 306 defines an touch-sensitive active area that provides touch location detection, returning touch event information that includes touch location as Cartesian coordinates (e.g., X- and Y-axis values representing touch location within the two-dimensional width and height of the active area).

During operation, the gaming device 200 provides a wagering game to the player 308. The gaming device 200 (e.g., the game controller 202) generates video output associated with the wagering game and transmits that video to displays 302, 304 for presentation. In some embodiments, the video output may be a single video stream that is segmented (e.g., spliced) into upper and lower video streams for presentation on secondary display and primary display, respectively. In other words, the video output may initially be the size of both displays 302, 304 together, then separated and synchronized for display on the two different screens (e.g., the top portion being sent to secondary display 304 and the bottom portion being sent to primary display 302, where each display 302, 304 includes an independent LCD controller for that display, and where each controller receives a separate video input stream). For example, the video output of the wagering game may be X pixels wide by 2Y pixels tall. As such, the video output may be split into a top X by Y stream for the top display 304 and a bottom X by Y stream for the bottom display 302. In other embodiments, the wagering game may provide two or more independent video streams for two or more displays, such as the primary and secondary displays 302, 304. Since the touchscreen 306 and associated input operates independently from the generation and rendering of the display output, developers can program electronic games to use the touchscreen 306 input and the definitions of touch gestures in either of these configurations.

In the example embodiment, the wagering game defines touch gestures available to the player 308 during game play, as well as associated regions on the touchscreen 306 for such gestures. The touchscreen 306 detects touch events made by the player and transmits those inputs back to the game controller 202 for processing. Such inputs may include, for example, touch events, current touch location, release events, and so forth, and may perform such sensing at a pre-defined sampling rate (e.g., 25 hertz (Hz), 60 Hz, 120 Hz). For example, the wagering game may allow the player 308 to select and drag a symbol from one location to another on the touchscreen 306. Since both displays 302, 304 share a single touchscreen 306, the gaming device 200 may allow the player 308 to perform gestures across both displays 302, 304. For example, the wagering game may allow the player 308 to touch and drag a symbol from a secondary surface 324 of the secondary display 304 down onto a primary surface 322 of the primary display 302. As the player 308 slides their finger across the display junction 310, a gentle bend in the touchscreen 306 allows the player 308 to smoothly complete the transition from display 302 to display 304, or vice versa.

In some embodiments, the displays 302, 304 may be oriented together horizontally, sharing borderless left side and right side edges (e.g., in a "side-by-side configuration," not shown) and at an angle of the display inclination as described above. The touchscreen 306 similarly overlays both displays 302, 304, allowing the player 308 to perform touch gestures across displays 302, 304 from left to right or vice versa.

Figure 4:
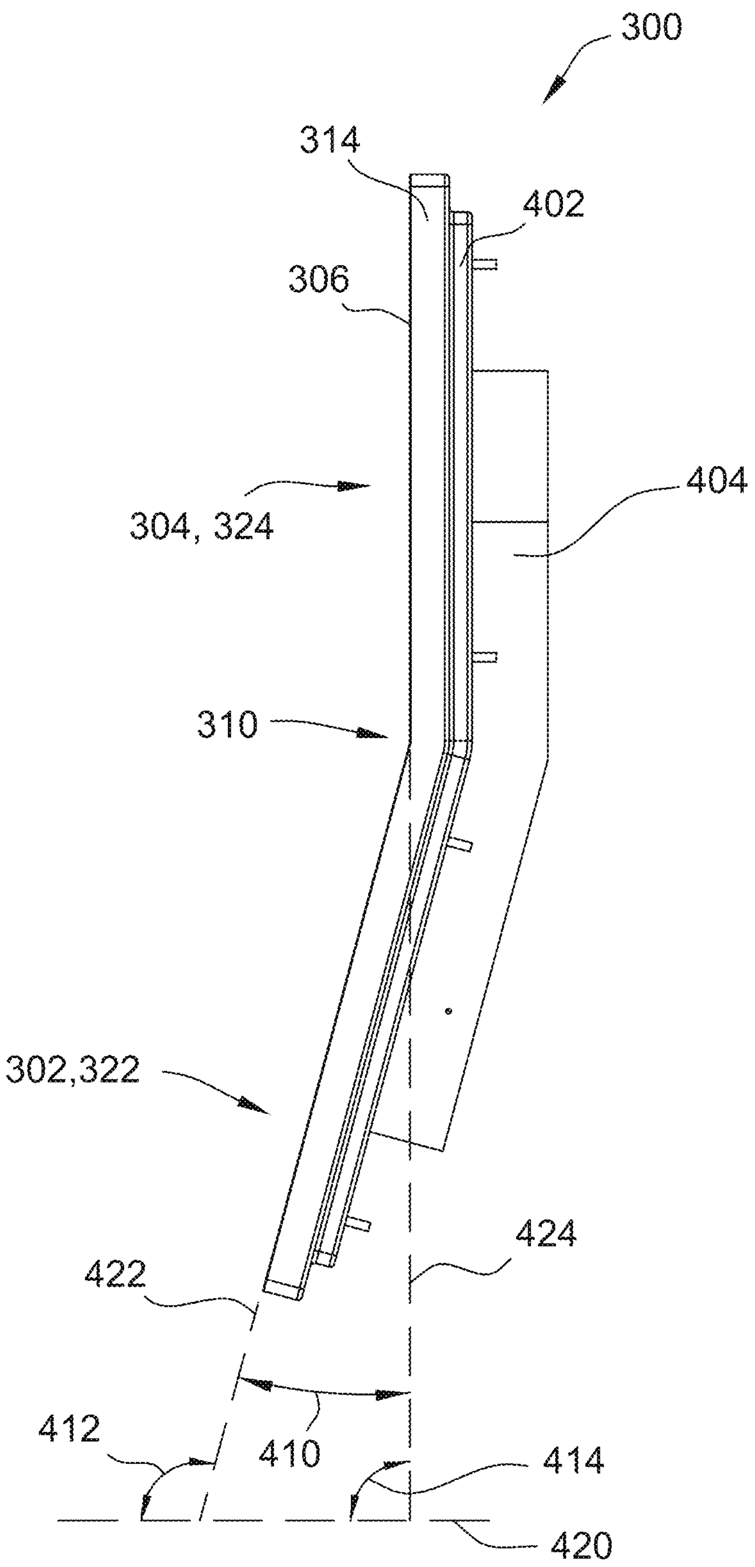
FIG. 4 is a right side view of the composite display. In the example embodiment, the sides and rear of the displays are enclosed by housing.

FIG. 4 is a right side view of the composite display 300. In the example embodiment, the sides and rear of the displays 302, 304 are enclosed by housing 314. Further, the housing 314 also includes a rear support housing 402. Rear support housing 402 provides structural support to the displays 302, 304 and optionally the button deck display 244 to achieve mechanical stability and alignment of these modules to the front glass. Rear support housing 402 is constructed, in the example embodiment, as a one-piece aluminium body, the periphery of which can act as a handle to facilitate assembling the modules to the rest of the assembly. Rear support housing 402 is coupled to a support spine 404 that allows the composite display 300 to be mounted to structural components (not shown) of the gaming device 200.

In the example embodiment, FIG. 4 illustrates a display inclination 410 between the primary display 302 and the secondary display 304. The display inclination 410 is an angle of inclination between the primary display 302 and the secondary display 304. As shown here, the secondary display 304 defines a secondary display plane 424 that is approximately vertical, forming a secondary display tilt angle 414 of 90 degrees with horizontal plane 424. The primary display 302 defines a primary display plane 422, defining a primary display tilt angle 412 with horizontal plane 424. The angle between the primary display plane 422 and the secondary display plane 424 defines the display inclination 410. While the composite display 300 is illustrated here as having the secondary display 304 as approximately vertical, it should be understood that the composite display 300 may be oriented at other angles while maintaining the same display inclination 410. In the example embodiment, display inclination 410 is 15 degrees. In some embodiments, the display inclination 410 is between 8 and 22 degrees. A display inclination towards 8 degrees may be suited to upright-configuration cabinets, which are typically shorter in height and are raised on a pedestal. In comparison, a display inclination towards 22 degrees may be suited to slant-configuration cabinets, which are typically taller in height and rest on the venue floor. In some embodiments, the display inclination 410 may be between 0 and 22 degrees (excluding 0 degrees, which exhibits no bend). In some embodiments, the display inclination 410 may be between 0 and 35 degrees. The display inclination 410 contributes to the aesthetics and appearance of the two displays 302, 304 being a single curved display, thus making the gaming device 200 more appealing to players. Further, the combination of the single touchscreen 306 and a modest display inclination 410 between the inclined displays 302, 304 also allows the player to perform "drag" gestures across the display junction 310 with a smooth transition between displays 302 and 304 (e.g., avoiding broken drag gestures where the player's finger loses contact with the touchscreen 306, effectively cancelling the gesture before completion).

The touchscreen 306 forms a rounded surface at display junction 310, as the touchscreen 306 transitions between the displays 302, 304. This rounded surface may be described herein as having a radius of curvature (or "bend radius") (not separately labelled) at display junction 310. In the example embodiment, the bend radius is 200 millimetres. In some embodiments, the bend radius is between 200 millimetres and 300 millimetres. Increasing beyond a 300-millimetre bend radius, the display junction 310 appears to be an increasingly flat surface, such that the displays 302, 304 together appear to increasingly resemble a curved display rather than an angled display. Further, increasing beyond a 300-millimetre bend radius, the separation between the displays 302, 304 become increasingly wide such that an illusion of a single display becomes diminished. This illusion is discussed further below.

Figure 5:
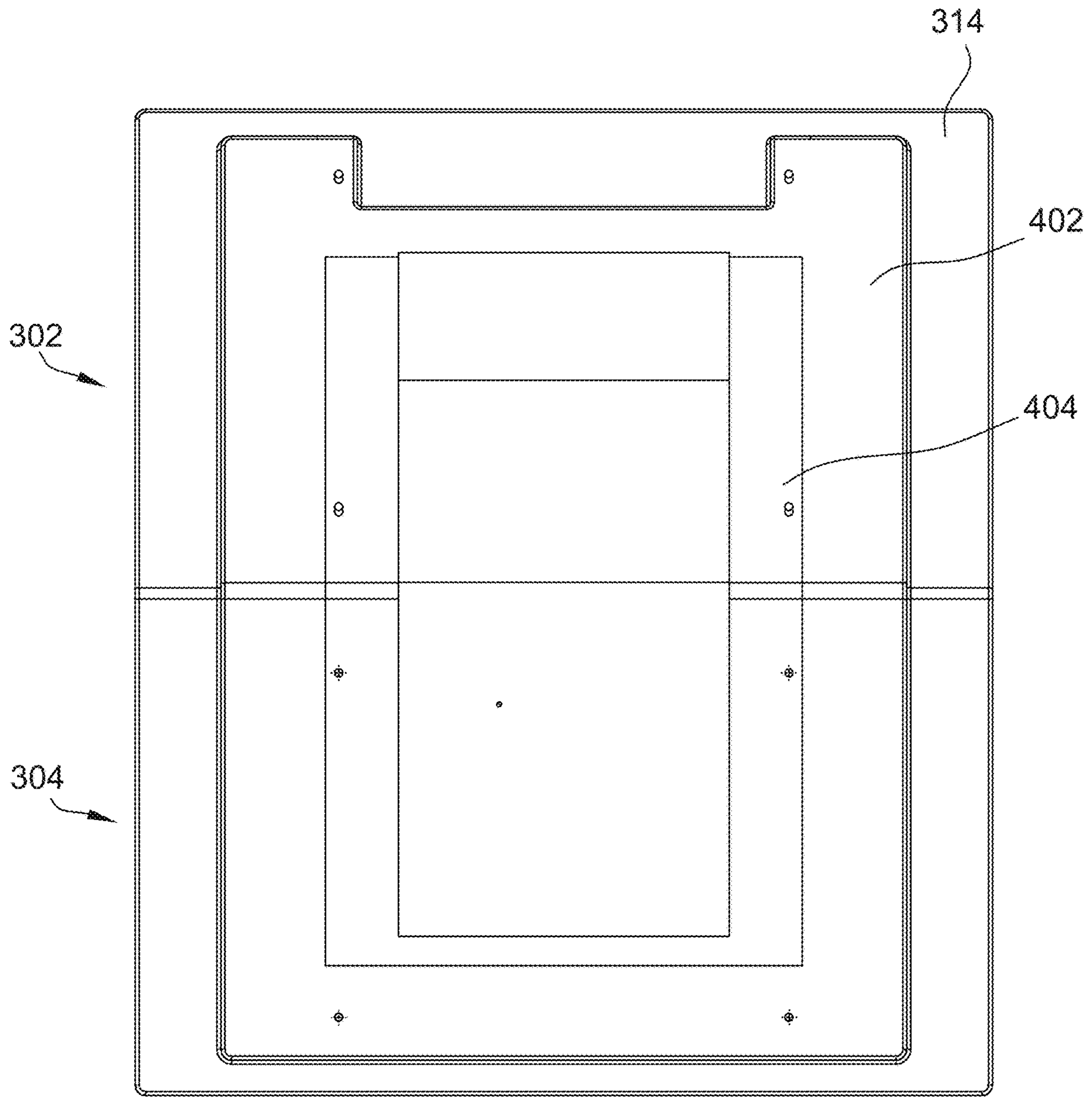
FIG. 5 is a rear view of the composite display.

FIG. 5 is a rear view of the composite display 300. In the example embodiment, the two displays 302, 304 are mounted together with housing 402, with the display inclination 410 as shown in FIG. 4. Housing 402 is connected to support spine 404, which may then be used to couple the composite display 300 to cabinet 218 of the gaming device 200.

Figure 6:
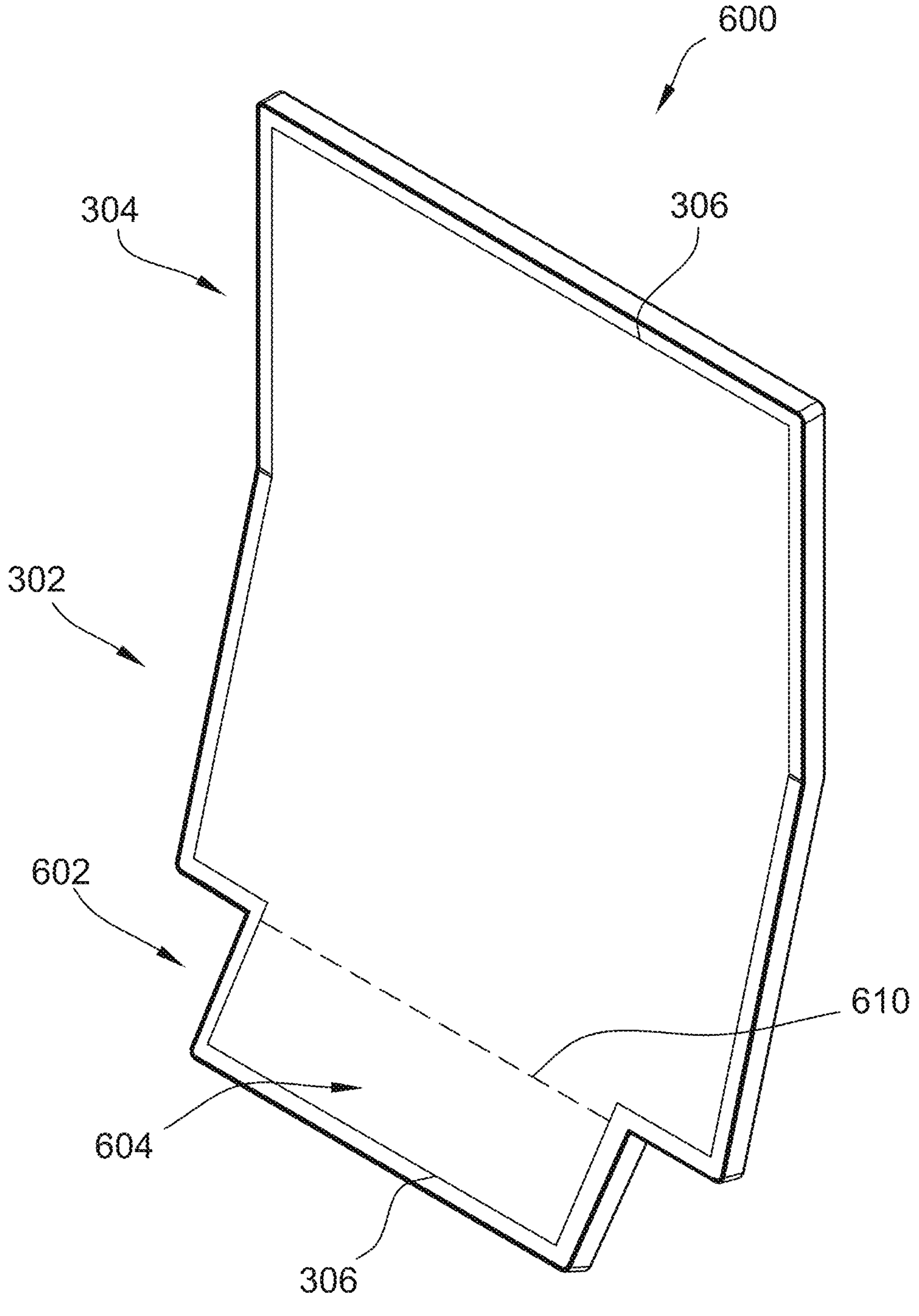
FIG. 6 is a perspective view of another composite display that includes a button deck display.
Figure 7:
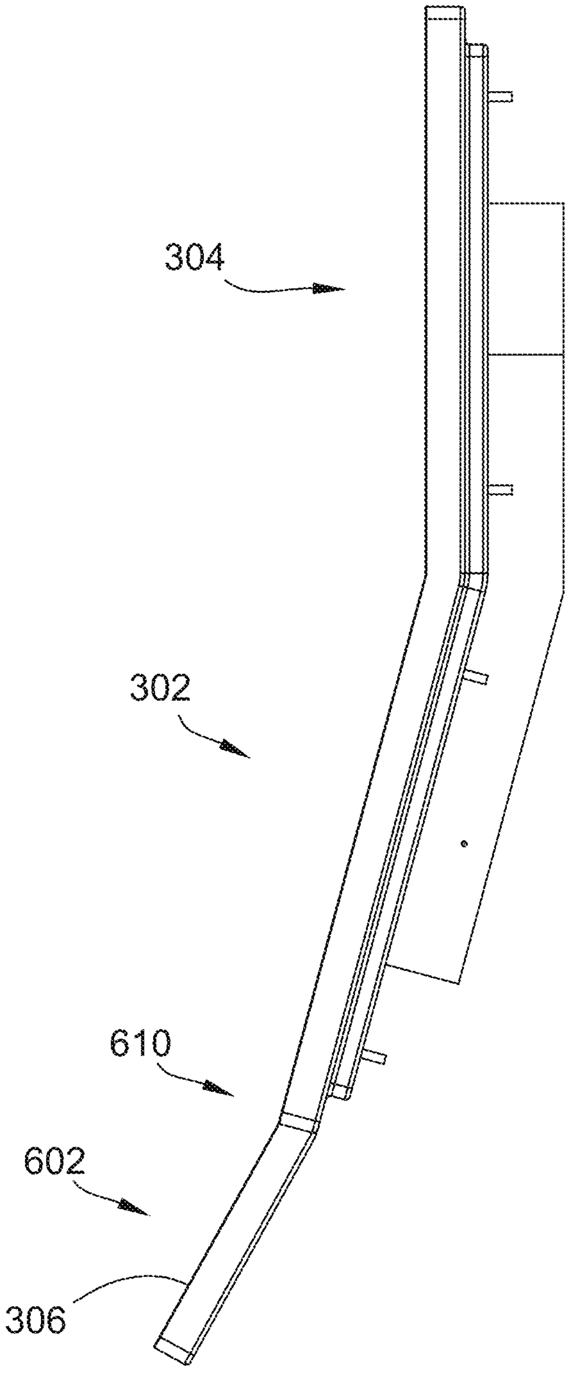
FIG. 7 is a right side view of the composite display shown in FIG. 6.

FIG. 6 is a perspective view of another composite display 600 that includes a button deck display 602. FIG. 7 is a right side view of the composite display 600. Referring now to FIGS. 6 and 7, in the example embodiment, the composite display 600 includes the displays 302, 304 of composite display 300. Further, the button deck display 602 is provided below the primary display 302 and forms a display junction 610 between displays 302, 602 similar to the display junction 310 between displays 302, 304. Button deck display 602 may be similar to displays 302, 304. The button deck display 602 is an LCD display device that receives video output from the gaming device 200, which may include graphics from the wagering game or virtual button graphics for operation of the gaming device 200 (e.g., as typically provided by physical buttons). The button deck display 602 forms a button deck display inclination with the primary display 302 at display junction 610 similar to the display inclination 410 formed between displays 302, 304. In the example embodiment, the button deck display inclination is 15 degrees. In some embodiments, the button deck display inclination is between 8 and 22 degrees. In some embodiments, the button deck display inclination is between 0 and 45 degrees (excluding 0 degrees, which exhibits no bend). The button deck display inclination may be designed to suit players' comfort, such as allowing players to rest their hand, wrist or palm on the button deck display 602. The achievable inclination is limited by the glass thickness. In one example embodiment, the button deck display inclination is 45 degrees with 3 to 5 millimetre glass thickness.

The touchscreen 306, in the example embodiment, covers both displays 302, 304, and additionally extends to cover the button deck display 602 to provide a button deck surface 604 through which the gaming device 200 receives player input. The gaming device 200 allows graphics to be provided on the button deck display 602 that can both provide button functionality through virtual buttons displayed on the button deck display 602 and activated by touch of the player 308, as well as enabling the wagering game to integrate game play graphics into the button deck. For example, in a video poker game, the gaming device 200 may display a current hand of the player 308 on the button deck display 602 and may allow the player 308 to drag and drop cards to or from their hand on the button deck display 602 (e.g., to and from the primary display 302). As such, the button deck display 602 and extension of the touchscreen 306 provide a surface positioned similar to a conventional button deck (e.g., directly below the primary display 302) and through which players 308 can operate the gaming device 200 or otherwise interact with the wagering game. Further, the composite display 600 allows game developers additional display surface through which they can provide more engaging and interesting game mechanics.

In some embodiments, the touchscreen 306 may extend across the primary display 302 and the button deck display 602 but not the secondary display 304. In some embodiments, the button deck display 602 can appear disjointed or separate from the primary display 302 by a "transition area" (not shown) (e.g., by displaying a "virtual bezel" or black border on or at a junction between the primary display 302 and the button deck display 602, or by providing an actual bezel or gap between the displays 302, 602 over which the touchscreen 306 extends). Such a transition area may not present any video display output but, since the touchscreen 306 extends across the blank area, may still provide touch input, thereby allowing touch gestures to occur across the blank area even though no output is provided. In some embodiments, the transition area may be a flat surface that is angled relative to either or both of the button deck surface 604 and the primary display 302. In other embodiments, the transition area may be a curved surface transitioning from the button deck surface 604 to the primary display 302. The transition area allows the total angle 410 of the button deck display 602 relative to the primary display 302 to be increased (e.g., nearer to or at horizontal) over what might otherwise be feasible or practical. Having a horizontal button deck surface 604 may be preferable in certain circumstances.

Figure 8:
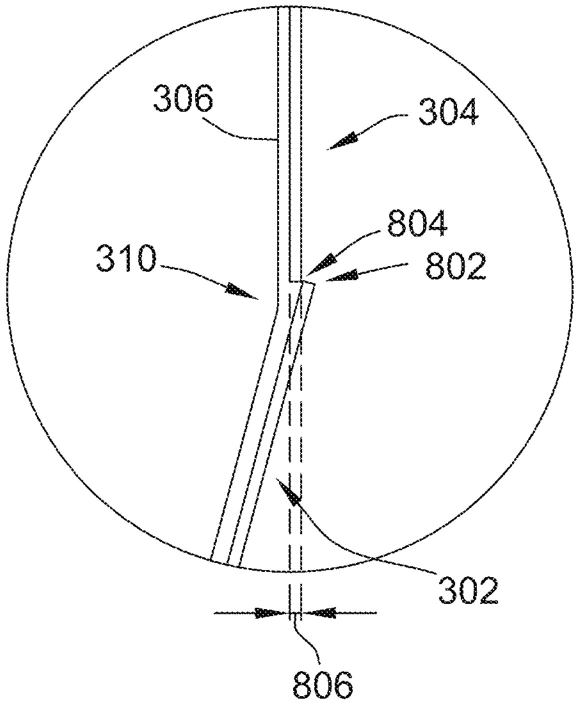
FIG. 8 is a magnified illustration of the display junction where the primary display meets the secondary display.

FIG. 8 is a magnified illustration of the display junction 310 where the primary display 302 meets the secondary display 304. A visual gap can appear between displays 302, 304 when mounting such borderless displays near each other. The human eye can pick up on small gaps, causing the player 308 to notice the discrepancy and perhaps destroy the illusion of a single display. To limit this gap, some embodiments, an upper corner 802 of the primary display 302 is offset slightly (e.g., rearwardly offset) beneath and behind a lower corner 804 of the secondary display 304 by an offset distance 806. In the example shown here, the offset distance is between 3 and 10 millimetres. When the player 308 views the output from the two displays 302, 304 at the display junction 310, and from a typical viewing angle (e.g., while seated at the gaming device 200), the offset of the upper corner 802 of the primary display 302 underneath the lower corner 804 of the secondary display 304 causes the lowest row of pixels of the secondary display 304 to appear approximately adjacent to the highest row of pixels of the primary display 302. This near-overlap minimizes or eliminates any perceived gap between the two distinct displays 302, 304. Further, the feeling of the smooth transition of the touchscreen 306 over the display junction 310 enhances the illusion that the two displays 302, 304 are really one. Since the touchscreen 306 operates independently of the displays 302, 304, the touchscreen 306 still provides input location data across the display junction 310 and, as such, can still be used by the electronic game to generate display data associated with touch gestures.

Figure 9:
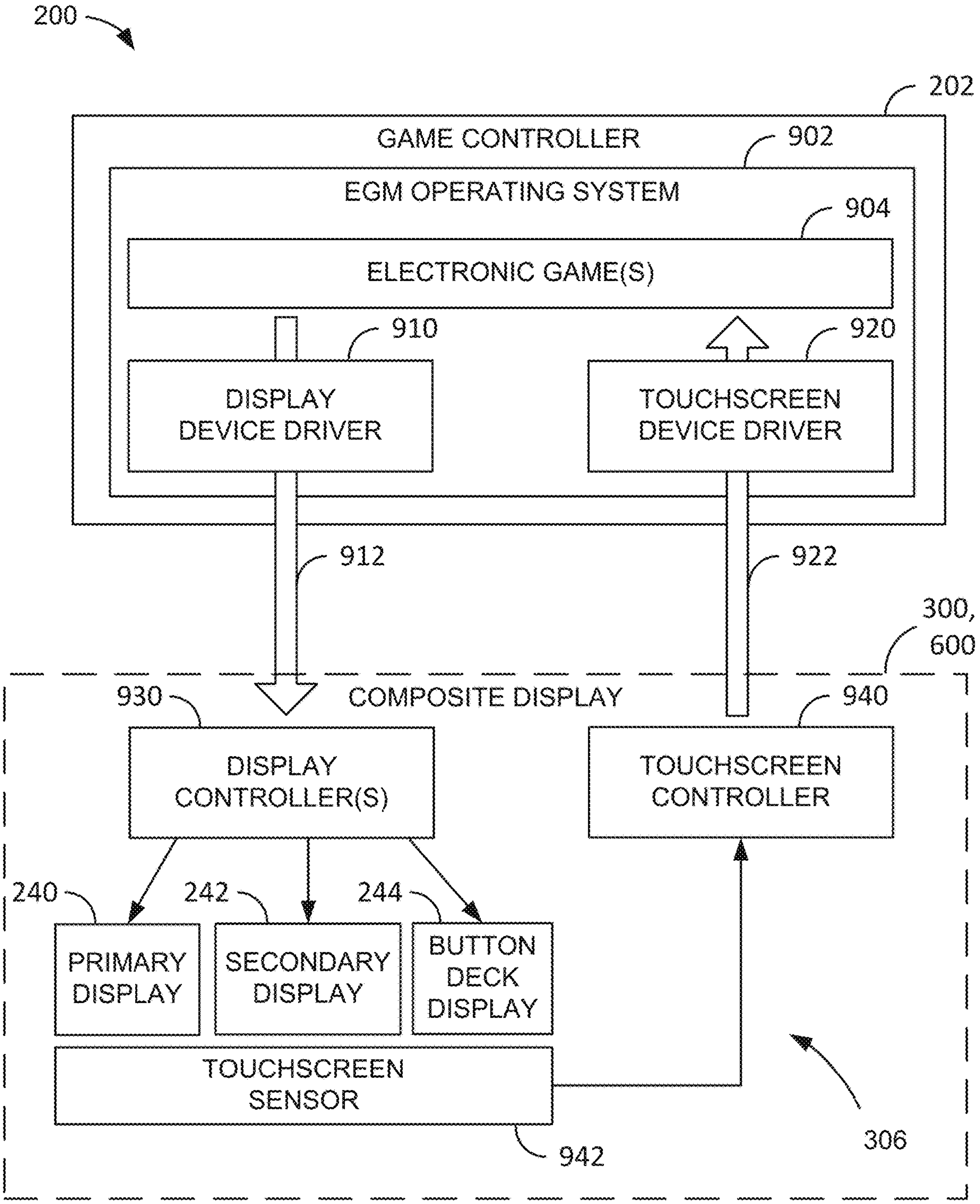
FIG. 9 is an architectural diagram of the gaming device that includes hardware components of an example composite display, such as the composite displays.

FIG. 9 is an architectural diagram of the gaming device 200 that includes hardware components of an example composite display, such as the composite displays 300, 600. It should be understood that various hardware components of the gaming device 200 are excluded from FIG. 9 for purposes of discussion. In the example embodiment, FIG. 9 illustrates hardware components of the game controller 202 and hardware components ("device hardware") associated with the composite display 300, as well as aspects of data flow between components during operation. The game controller 202 executes an EGM operating system 902 (e.g., Linux, Microsoft Windows®, or the like). The EGM operating system 902, during primary operation, executes an electronic game 904 (e.g., one or more wagering games offered to players for game play). During execution of the electronic game 904, the game 904 generates digital video output (e.g., computer graphics, full motion video, static images, and the like) and sends that video output to a display controller 903 for presentation on composite display 300.

More specifically, in the example embodiment, the composite display 300 includes one or more display controllers 930 that are configured to output graphics onto the supported displays (e.g., primary display 240, secondary display 242, button display 244). The EGM operating system 902 provides a display device driver 910 that allows processes executing on the game controller 202 (e.g., the electronic game 904) to output graphics to the composite display 300, thereby displaying those graphics to the player during game play. This flow of digital video output is represented here as a graphics rendering pipeline 912. It should be understood that the graphics rendering pipeline 912 may include other hardware and software not expressly shown here for purposes of brevity (e.g., dedicated memory or frame buffers, graphics libraries, and the like).

Additionally, during execution of the electronic game 904, the game 904 also accepts touchscreen input data 922 from the touchscreen device 250 (e.g., player touch gestures). Similar to the touchscreen 306 described above, the touchscreen device 250 includes a touchscreen sensor 942 (e.g., a touch sensitive input device) that is configured to detect touch gestures (e.g., location of touch, touch pressure, or the like). The touchscreen sensor 942 detects and transmits sensor data to a touchscreen controller 940. The EGM operating system 902 provides a touchscreen device driver 920 that allows the electronic game 904 to incorporate touchscreen gestures as player inputs into game play through communications with the touchscreen controller 940. In the example embodiment, the touchscreen sensor 942 is a single surface that overlays each of the displays 240, 242, 244, thereby providing a single two-dimensional geometry (e.g., in X- and Y-axis coordinates) within which touch gestures can be detected.

During operation, video output generated by the electronic game 904 is transmitted through the display device driver 910 to the display controller(s) 930 of the composite display 300. In some embodiments, the electronic game 904 is configured to generate separately generate a graphics output stream for each display device (e.g., a separate output stream or rendering pipeline 912 for each display 240, 242, 244). As such, the display controller(s) 930 may display each output stream to a designated display device 240, 242, 244.

In the example embodiment, the gaming device 200 is configured to generate a single composite graphics output stream that is displayed upon two or more of the display devices 240, 242, 244. For example, presume the composite display 300 uses only the primary display 240 and the secondary display 242 for video output, and the game 904 is configured to generate 4K graphics (e.g., 3,840 horizontal pixels) and at a height of twice the 4K standard (e.g., 2,160 vertical pixels times 2=4,320 vertical pixels). In other words, the game 904 generates composite video output geometry of 3,840×4,320 pixels. Further, the touchscreen 306 overlays both the primary display 240 and the secondary display 242 and defines a single two-dimensional geometry (e.g., X- and Y-axis touch locations) equivalent in size to the 3,840×4,320 dimensions of the composite video output (e.g., allowing mapping of touch locations between the touchscreen geometry and the composite video output geometry). As such, the game 904 can be configured to define and utilize touch gestures across a common geometry shared between the composite video output and the single input geometry of the touchscreen. Since the display devices 240, 242 are two separate devices, the composite video output is segmented prior to display (e.g., by the display controller 930), sending a portion of the video output to the primary display 240 (e.g., as the bottom display, the lower 3,480×4,320 pixels of the composite video output geometry) and the other portion of the video output to the secondary display 242 (e.g., as the top display, the upper 3,480×4,320 pixels of the composite video output geometry). In some embodiments, the gaming device 200 may be configured to use DisplayPort and a daisy chained monitor setup (e.g., DisplayPort 1.2 and associated hardware as promulgated by the Video Electronics Standards Association ("VESA")). In some embodiments, the gaming device 200 may be configured to use multi-display "Eyefinity" technology provided by Advanced Micro Devices ("AMD", of Santa Clara, Calif., US), or GeForce "Surround" technology provided by Nvidia Corporation (of Santa Clara, Cali., US). Accordingly, the composite display 300 allows game developers to developers to operate in a single shared geometry between the graphics and the touch inputs even though the graphics are later separated and directed to multiple distinct display devices. Further, while this example describes use of the primary display 240 and the secondary display 242, it should be understood that these methods can similarly be performed with other combinations, such as the primary display 240 and the button deck display, or the primary display 240, the secondary display 242, and the button deck display 240, where the geometries of video output and the touch inputs would similarly be mappable and where the geometry of the composite video output would similarly be segmented for each individual display.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory (e.g., memory 208) may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising a composite display device, the composite display device comprising:

- a primary display device that includes a first borderless edge;
- a secondary display device that includes a second borderless edge;
- a housing for mounting the primary display device and the secondary display device, the primary display device being mounted with the first borderless edge adjacent to the second borderless edge of the secondary display device, thereby forming a display junction between the primary display device and the secondary display device; and
- a touchscreen device for receiving touch input from a player of the electronic gaming device proximate to the display junction, the primary display device, and the secondary display device, the touchscreen device covering at least a portion of the display junction, a portion of the primary display device, and a portion of the secondary display device, wherein the touchscreen device at the display junction comprises an arcuate surface configured to allow for gestures across the display junction.

2. The electronic gaming machine of claim 1, wherein the touchscreen device comprises a single touchscreen surface layer covering substantially all of a display surface of the primary display device, substantially all of a display surface of the secondary display device, and substantially all of the display junction.

3. The electronic gaming machine of claim 1, wherein the secondary display device is mounted above the primary display device, wherein the first borderless edge of the primary display device is an upper edge of the primary display device, wherein the second borderless edge of the secondary display device is a lower edge of the secondary display device.

4. The electronic gaming machine of claim 3, wherein the upper edge of the primary display device is rearwardly offset by an offset distance behind the lower edge of the secondary display device.

5. The electronic gaming machine of claim 4, wherein the offset distance is between 3 and 5 millimeters.

6. The electronic gaming machine of claim 1, wherein the secondary display device is mounted horizontally adjacent to the primary display device, wherein the first borderless edge of the primary display device is one of a right edge and a left edge of the primary display device, wherein the second borderless edge of the secondary display device is the other of a right edge and a left edge of the secondary display device.

7. The electronic gaming machine of claim 1, wherein the primary display device and the secondary display device are liquid-crystal display devices.

8. The electronic gaming machine of claim 1, further comprising a button deck display device having at least one borderless edge including a third borderless edge, wherein the primary display device includes a fourth borderless edge, wherein the button deck display device is mounted with the third borderless edge adjacent to the fourth borderless edge, wherein the touchscreen device covers at least a portion of the of the button deck display device.

9. The electronic gaming machine of claim 1, wherein the touchscreen bends at a bend radius of between 200 and 300 millimeters at the display junction.

10. The electronic gaming machine of claim 1 further comprising:

- a credit input device including at least one of a card reader, a ticket reader, a bill acceptor, a coin input device, and a digital wallet interface, wherein the credit input device is configured to receive a credit wager;
- a storage medium having instructions stored thereon; and
- a game controller configured to execute instructions stored in a tangible, non-transitory, computer-readable storage medium, which, when executed by the game controller, cause the game controller to provide a wagering game.

11. The electronic gaming machine of claim 10, wherein the instructions further cause the game controller to:

- receive, from the touchscreen device, an input indicative of a touch gesture beginning on a primary surface of the touchscreen device over the primary display device, traversing across the display junction between the primary display device and the secondary display device, and ending on a secondary surface of the touchscreen device over the secondary display device; and generate and transmit video output to the primary display device and the secondary display device for display to the player in response to the touch gesture.

12. The electronic gaming machine of claim 10, wherein the instructions further cause the game controller to:

receive composite video output generated by the wagering game;

divide the composite video output into a first video output and a second video output; and display the first video output on the primary display device and the second video output on the secondary display device.

13. The electronic gaming machine of claim 12, wherein dividing the composite video output includes:

determining a first display resolution size for the first video output;

identifying a first display region within the composite video output based on the first display resolution size; and using video data from the first display region of the composite video output as the first video output displayed on the primary display device.

14. The electronic gaming machine of claim 13, wherein dividing the composite video output further includes using video data not included in the first display region of the composite video output as the second video output displayed on the secondary display device.

15. The electronic gaming machine of claim 13, wherein identifying the first display region further includes determining a configuration position of the primary display device relative to the secondary display device, wherein identifying a first display region within the composite video output is further based on the configuration position of the primary display device relative to the secondary display device.

16. The electronic gaming machine of claim 12, wherein the secondary display device is a button deck display device, wherein dividing the composite video output includes:

determining a button deck display resolution size for the button deck display device;

identifying a button deck display region within the composite video output based on the button deck display resolution size; and using video data from the button deck display region of the composite video output as the first video output displayed on the button deck display device.

17. The electronic gaming machine of claim 12 further comprising a button deck display device, wherein dividing the composite video output includes:

determining a button deck display resolution size for the button deck display device;

determining a primary display resolution size for the primary display device;

determining a secondary display resolution size for the secondary display device; and dividing the composite video output based on the button deck display resolution size, the primary display resolution size, and the secondary display resolution size.

18. The electronic gaming machine of claim 17, wherein the wagering game is configured to provide a touchscreen gesture that includes a display component and an input component, wherein the touchscreen gesture is configured to be performable across two or more of the primary display, the secondary display, and the button deck display.

19. The electronic gaming machine of claim 12, wherein the composite video output defines a video geometry, wherein the touchscreen defines an input geometry, wherein the electronic gaming machine is further configured to map locations on the touchscreen device to locations within the composite video output.

20. The electronic gaming machine of claim 19, wherein the video geometry is equal to the input geometry.

* * * * *